W. B. KLEIN.
FILTER.
APPLICATION FILED APR. 20, 1908.
902,971.
Patented Nov. 3, 1908.
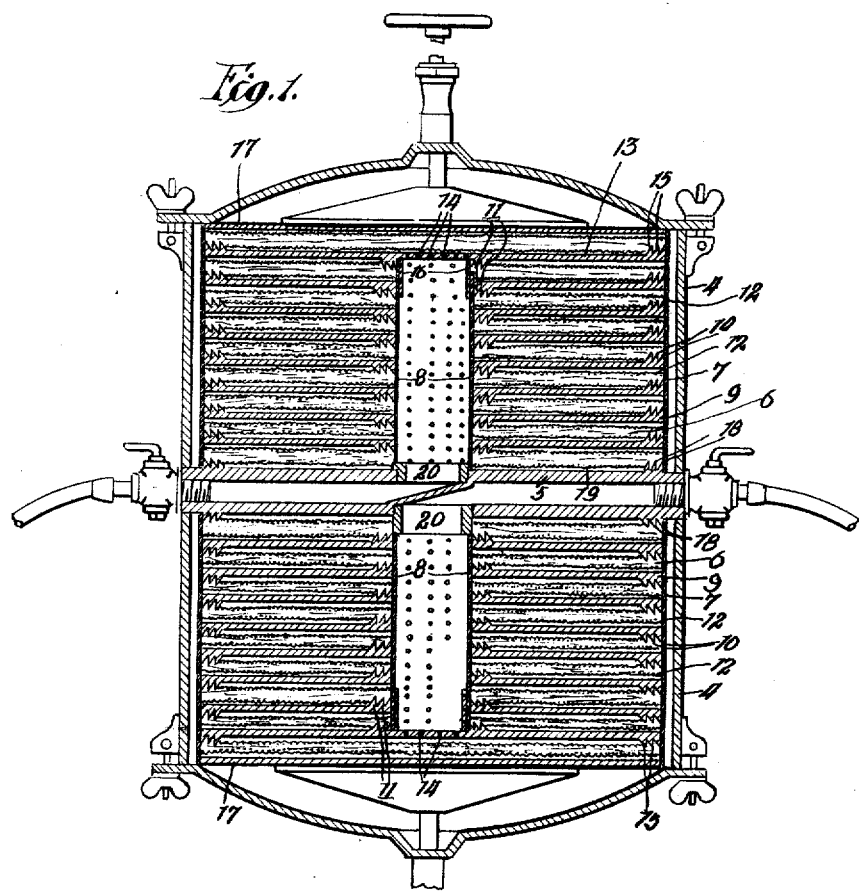
Fig. 1.
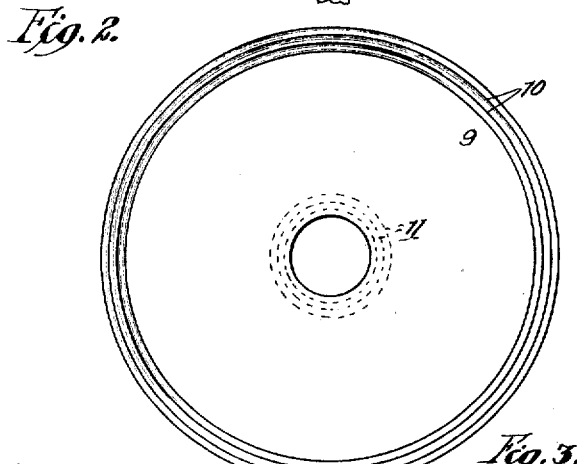
Fig. 2.
Fig. 3.
Witnesses:
Inventor:
William B. Klein

UNITED STATES PATENT OFFICE.

WILLIAM B. KLEIN, OF CHICAGO, ILLINOIS.

FILTER.

No. 902,971.  Specification of Letters Patent.  Patented Nov. 3, 1908.

Application filed April 20, 1908. Serial No. 428,280.

*To all whom it may concern:*

Be it known that I, WILLIAM B. KLEIN, a citizen of the United States, residing at Chicago, in the county of Cook and State of Illinois, have invented certain new and useful Improvements in Filters, of which the following is a specification.

This invention relates more particularly to filter plates for use in filters of the general style shown in Patent No. 816,479, issued to me March 27, 1906; although the filter plates may be otherwise employed.

In numerous prior constructions of the general style of filters in question, the filter plates have been so constructed and arranged that the pressure of the entering liquid tends to separate the filter body or packing into layers and force the layers apart, thereby creating seams or openings through which the unfiltered liquid tends to flow rather than through the filter medium itself, so that the filtration is rendered imperfect.

The object of the present invention is to so construct and arrange the filter plates that the pressure of the admitted liquid will serve to hold the filter body or packing tightly compressed against the plates, thus affording tight joints which will prevent the formation of seams and the passage of the liquid save only through the mass of the filter body. The plates are so constructed and arranged that the greater the pressure of the admitted liquid the tighter will be the joint between the plate and the packing.

The invention further contemplates the use of filter plates of a uniform size and style rather than of alternate sizes as have been frequently used in certain prior constructions, thereby simplifying the resultant construction.

The invention consists of the features of construction and combination of parts hereinafter described and claimed.

In the drawings, Figure 1 is a longitudinal sectional elevation of a filter of the general style shown in my patent above referred to, showing the filter plates of the present invention in cross section; Fig. 2 a face view of one of the filter plates; and Fig. 3 an edge elevation thereof.

It is not deemed necessary to describe in detail the general structure of the filter itself since devices of this kind are well understood. As shown, the filtering plates of the present invention are applied to a double-ended filter, comprising a cylindrical shell 4 divided into two sections by means of a cross partition 5 having formed therein suitable inlet and outlet passages. It is not intended, however, to limit the present invention to a filter of the double variety herein referred to, nor to an arrangement of inlet and outlet passages of any particular formation. The filtering packing or material 6 is located within an annular space formed between an outer cylindrical foraminous wall 7 and an inner foraminous tubular column 8. The packing is located intermediate a plurality of ring shaped filter plates 9, the outer edges of which abut against the shell 7 and the inner edges of which abut against the column 8. Each of the filter plates is provided, around its periphery, with a plurality of annular wedge shaped ribs or ridges 10, and around its inner edge with a plurality of similar inner ribs or ridges 11. The plates are further provided, on both sides, with layers of screening or similar mesh material 12 against which the packing directly rests. The screening sections are of ring formation and of a size to rest upon the flat upper and lower surfaces of the plates intermediate the rings or ridges thereof and the foraminous inner and outer walls of the packing chamber.

The outermost filtering plate 13 differs slightly from the inner plate previously described, in that, instead of being of ring shape formation and provided with inner ribs or ridges, it is of circular shape and provided, in its center, with perforations 14 which overlie the outer end of the tubular column 8. The plate, however, is provided, around its periphery, with ribs or ridges 15 similar to the ribs or ridges previously described. The plate 13 is further provided, in its center, with a depending tubular perforated sleeve 16 which telescopes into the end of the tubular column 8 and forms, in effect, a continuation thereof. The filtering chamber is closed at the end by means of a solid or unbroken end plate 17 adapted to be compressed in any suitable manner. The outer filtering plate 13 and the end plate 17 are both provided with layers of screening or mesh material similar to the layers previously referred to. The partition wall 5, in the form shown, is likewise provided with circumferential ribs or ridges 18 and a layer of screening 19, the partition being perforated in its center to receive a bushing 20.

The filter, in the form shown, is of a double chamber variety adapted for double or tandem filtration, but it will be understood that the present invention is not intended to be limited in any way to a filter of this particular character, so that the specific construction of the partition wall may be changed or the filter plates supplied to a single chambered filter without any substantial modification.

It will be noted that the circumferential ribs or ridges and the inner ribs or ridges are located on opposite faces of the plates and that the plates are so arranged that all of the circumferential ribs or ridges will extend in one direction and all of the inner ribs or ridges will extend in the opposite direction and that said ribs or ridges will lie in close contact with the outer and inner foraminous walls of the filtering chamber.

In use the unfiltered liquid admitted to the filtering chamber will enter under pressure through the holes or perforations in the outer cylindrical wall and will flow into the meshes of the layers of screening, which are in contact with the perforated cylindrical wall on that side of the filtering plates only which are unbroken by circumferential ribs or ridges. The liquid thus admitted, being under pressure, will exert a pressure on the adjacent layer of packing, thereby tending to force or embed the packing between the ribs or ridges of the next adjacent plate, so that a tight joint will be maintained between the ribs of the plate and the packing. The liquid thus admitted will travel through the meshes of the sections of screening until it is brought up to the inner ribs or ridges and thereafter will be forced through the packing to the next adjacent layer of screening which overlies the smooth inner face of the next adjacent filtering plate, which latter layer of screening will convey the liquid to the point of discharge into the perforated tubular column 8. In similar manner the packing is held embedded within the inner ribs or ridges so that no seams or openings will be afforded for the escape of liquid prior to its filtration. After the liquid has passed through the filter body from one layer of screening to the next adjacent layer, it will exert a compression on the opposite side of the layer of packing, and the pressure so exerted will thus force the packing into the spaces between the inner ribs or ridges.

In view of the fact that all of the filtering plates are of uniform size and extend completely across the filtering chamber, and, in view of the arrangement of the inner and outer ribs or ridges, it is clear that it will be impossible for the liquid under pressure to divide the packing into additional layers by the formation therethrough of seams or openings so that the packing body will maintain its proper compression and the filtering action will continue regardless of the resistance due to clogging in the filter.

What I claim as new and desire to secure by Letters Patent is:

1. In a filter of the class described, a plurality of plates provided with ribs or ridges near their circumference on one side only, a packing body between the plates, and a foraminous outer shell surrounding the plates and adapted to admit liquid to the packing body at a point to exert a compression thereon tending to embed said packing in the ribs or ridges of the next adjacent plate, substantially as described.

2. In a filter of the class described, a plurality of plates provided with ribs or ridges near their circumference on one side only, a packing body between the plates, a foraminous outer shell surrounding the plates and adapted to admit liquid to the packing body at a point to exert a compression thereon tending to embed said packing in the ribs or ridges of the next adjacent plate, inner ribs or ridges formed only on the opposite faces of the plates, and a foraminous inner column inside the packing body, substantially as described.

3. In a filter of the class described, the combination of a plurality of filter plates provided around their peripheries with ribs or ridges on one side only and provided near their centers with inner ribs or ridges on the other side only, layers of screening lying adjacent the unbroken portions of the plates on opposite sides thereof, layers of packing intermediate the screens, a foraminous shell surrounding the plates and abutting against the ribs or ridges and against the layers of screening on the sides opposite such ribs or ridges, and a foraminous inner column inside the packing body and abutting against the inner ribs or ridges and against the layers of screening on the sides of the plates opposite thereto, substantially as described.

4. In a filter of the class described, the combination of a plurality of filter plates provided around their peripheries with ribs or ridges on one side only and provided near their centers with inner ribs or ridges on the other side only, layers of screening lying adjacent the unbroken portions of the plates on opposite sides thereof, layers of packing intermediate the screens, a foraminous shell surrounding the plates and abutting against the ribs or ridges and against the layers of screening on the sides opposite such ribs or ridges, a foraminous inner column inside the packing body and abutting against the inner ribs or ridges and against the layers of screening on the sides of the plates opposite thereto, and an end filter plate provided with layers of screening and provided with circumferential ribs or ridges only, and further provided with holes or perforations overlying the tubular center column, substantially as described.

5. A filter plate having in its center an opening surrounded by inner ribs or ridges on one side only, and having around its outer edge ribs or ridges on its other side only, substantially as described.

6. In a filter, a filter plate having therein an opening surrounded by inner ribs or ridges on one side only and having on its opposite face, around its edge, outer ribs or ridges on one side only, a layer of screening of a size to overlie the smooth surface of that side of the plate unbroken by ribs or ridges at its center, and a layer of screening of a size to overlie the smooth surface of that side of the plate unbroken by outer ribs or ridges, substantially as described.

WILLIAM B. KLEIN.

Witnesses:
WALKER BANNING,
WILLIAM P. BOND.